April 23, 1963   P. PROFOS   3,086,503
METHOD AND MEANS FOR CONTROLLING A PROCESS OR PLANT
Filed March 11, 1959   4 Sheets-Sheet 1

Inventor.
PAUL PROFOS.
By K. H. May
Attorney.

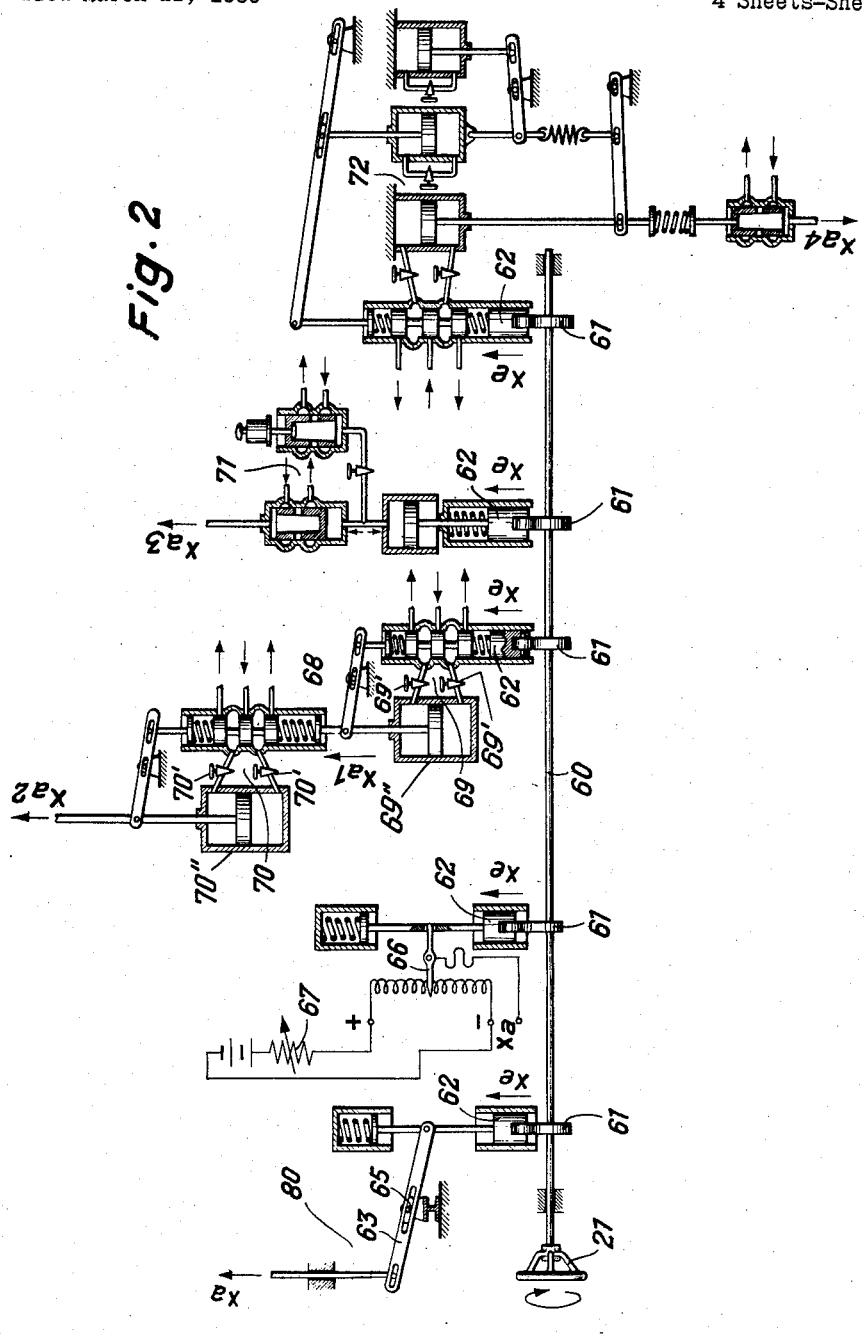

April 23, 1963  P. PROFOS  3,086,503
METHOD AND MEANS FOR CONTROLLING A PROCESS OR PLANT
Filed March 11, 1959  4 Sheets-Sheet 4

Inventor.
PAUL PROFOS.
By K. A. Mayr
Attorney.

United States Patent Office 3,086,503
Patented Apr. 23, 1963

3,086,503
METHOD AND MEANS FOR CONTROLLING A PROCESS OR PLANT
Paul Profos, Winterthur, Switzerland, assignor to Sulzer Freres, S.A., Winterthur, Switzerland, a corporation of Switzerland
Filed Mar. 11, 1959, Ser. No. 798,790
Claims priority, application Switzerland Mar. 12, 1958
6 Claims. (Cl. 122—448)

The present invention relates to a method and means for controlling a process or a plant through which an operating medium is conducted, the operating medium being consecutively subjected to changes while passing through the process or plant. These changes are individually controlled by individual control means. A disturbance introduced into the process or plant is propagated through the process or plant by the operating medium and consecutively affects the control means. The set points of the control means are adjustable and are adjusted simultaneously by an apparatus common to all control means.

The invention is concerned with a control system for controlling a plurality of variables whereby the set point for each variable must be adjusted in order to reduce equilibruim disturbances in the process or plant to a minimum whenever a change, for example, of the quality or quantity of the operating medium flowing through the process or plant occurs. In a multicontrol system with which the invention is concerned, difficulties increase with increasing speed and/or magnitude of a disturbance, for example change of the amount of operating medium flowing through the plant which corresponds to the load carried by the plant. Since the individual variables, which are controlled in the process or plant, are all associated with the operating medium flowing through the plant, these variables affect or depend on one another and the control difficulties increase with increasing interdependence of the controlled variables.

The mutual influence of the controlled variables of individual parts of the process or plant is primarily caused by the movement of the operating medium within the process or plant whereby a static or dynamic change of a physical property of the operating medium, for example, temperature, pressure, moisture content, produces a disturbance which travels from the locus where the disturbance originates with the operating medium through the subsequent parts of the process or plant.

The change of the operating medium while it passes through the process or plant may be physical, inter alia, may be a change of pressure, of temperature, of specific weight, of tension, of heat content, or of the state of aggregation. The change, however, may also be of a chemical nature.

The mutual effect of controlled variables of individual parts of a process or plant is secondarily caused, and increased, by the interlinking of the individual control means, for example, by the master control apparatus for adjusting the set points of the individual control apparatuses.

The interconnection of the control apparatuses for individual sections or stages of the plant becomes more complicated, if the individual control circuits include auxiliary control circuits, as is the case if the control apparatus is not only responsive to a single measuring means but also to one or more auxiliary measuring means which jointly actuate the control apparatus, for example, for improving the control operation.

An auxiliary controlled variable may be measured within a control circuit for producing an auxiliary signal which is less retarded than the main signal produced by the circuit. A second auxiliary signal may be employed, if there is a variable which affects the control circuit faster than the main controlled variable. Systems are known in which an advance adjustment of the control means is effected by a disturbance which is measured at a point where the disturbance occurs before it advances to the main control circuit. The aforesaid measures transform a simple control circuit by the addition of auxiliary control circuits into a so-called "meshed" control circuit.

The mutual influence of controlled variables which is caused by the linking of control circuits increases with increased "meshing" of the individual control circuits of a control system.

Multicontrol systems having partly meshed control circuits are used, inter alia, in electric power systems, in steam generators and piping systems, in chemical processes and plants, for example for controlling distilling columns, in air conditioning systems, and refrigerating processes.

In a plant controlled by a multicontrol system having a plurality of coupled and, may be, meshed control circuits, a simultaneous adjustment, for example in response to the load, of the set points of all control circuits produces a, at least temporary, collapse of the equilibrium of the system. This difficulty could be avoided by indefinitely slowly adjusting the set points, or, as is done in chemical plants, by manually adjusting the control systems of individual parts of the plant according to the load. Indefinitely slow adjustment is, with a few exceptions, impracticable. Manual adjustment, even with well trained personnel is likely to be faulty and inaccurate and may be too slow or dangerous because of the imperfection of human nature.

It is an object of the present invention to provide a process and apparatus which avoids the difficulties experienced with conventional control systems. In the system according to the invention the signals produced by a set point transmitter or master control apparatus which is common to a plurality of control circuits, are transformed while they are transmitted to the individual control apparatuses whereby the signals are tuned to correspond to the dynamic characteristics of the whole plant and of the individual controlled parts of the plant.

In a preferred embodiment of the system according to the invention the set point signal for one control circuit is so transformed that its action is delayed relatively to the action of the set point signals for other control circuits, the delay corresponding to the dynamic behavior of the total plant and to that of the controlled part thereof. This can be effected, for example, by delaying the transmission of the set point signal.

The trannsmission of a set point signal for a controlled part of a plant may be postponed until a disturbance initiated by a load change of the entire plant begins to affect the equilibrium of the respective part of the plant.

In other cases it may be preferred to immediately transmit the set point signal and to stop the signal after a certain time.

The same result can be produced by transmitting a set point signal and by stopping its effect after a certain time by suitable action on the feedback of the respective control circuit.

Transformation of a set point signal for a part of the controlled plant may be effected by transmitting a signal whose energy is greater than that corresponding to the new set point until the respective control circuit approaches the new set point, and by thereupon and not later than the time the control circuit is set for the new load reducing the set point signal energy to that corresponding to the new equilibrium condition.

In many cases it will be desirable to change the time characteristic of the set point signal and to change the time factor of this characteristic according to the load.

If the invention is applied to a combustion apparatus in which the supply of fuel and air as combustion components is controlled, the set point signal produced by a master controller is delayed on its path from the master controller to the control apparatus for that of the combustion components which reacts more quickly to a change than the other combustion component. In a combustion apparatus for heating a steam generator the speed at which the firing apparatus can be adjusted to a new load depends on how quickly the new fuel supply can be made to correspond to the new combustion air supply. The adjustment of the fuel supply relatively to the combustion air supply is not effected in the same manner, for example if the adjustments of the control apparatus for the two supplies are effected suddenly and simultaneously. The ratio of the time needed for the adjustment of the fuel supply to that for the adjustment of the air supply depends on the fuel and on the type of combustion apparatus used and is very different for different combustion apparatuses.

In a fuel oil system the oil injected in the combustion chamber by the burners follows the new set point very quickly, generally within fractions of a second. This process, however, is considerably delayed in pulverized coal firing systems having a pulverized coal bunker. In these systems a change to the new set point generally takes several seconds. The delay is still greater when using blower mills in which new steady conditions must be produced in the mill which conditions correspond to the new load before the mill can supply a changed amount of fuel. In these systems the delay is one half to one minute, depending on the extent of the load change. Much greater delays are caused with other types of pulversized coal grinders in which systems a change of load from 30% to 100% may require several minutes.

The time required for changing the air supply depends on the type of the air supply control. If the latter is effected by means of dampers at constant speed of the fan, the air supply is changed immediately when the position of the damper is changed. Some delay may be caused by the inertia of the drive for changing the position of the damper. If, however, the combustion air supply is controlled by changing the speed of the fan, delay is caused by the mechanism for changing the speed of the fan whereto the time required for accelerating or decelerating the rotating masses of the fan must be added.

The conditions in an oil fired combustion apparatus may be so that at a simultaneous change of the air and fuel supply the control of the fuel supply is delayed relatively to the control of the air supply. In a pulverized coal fired combustion apparatus, however, the control of the air supply must be delayed relatively to the control of the pulverized coal supply.

The correct ratio between fuel supply and air supply is essential for efficient combustion not only during steady operation but also during the time required for a change of load. A deviation from the correct ratio causes variations of the $CO_2$ content of the combustion gases accompanied by the adverse effects on heat transfer and formation of smoke which causes additional sooting of the heating surfaces, for example, of a steam boiler. When burning fuels having a high ignition point a deviation of the correct ratio fuel/air at major load changes may cause extinction of the flame.

In order to avoid this disadvantage it has been proposed to add in pulverized coal firing systems a differential signal to the signal for changing the control of the fuel supply. This causes a temporary excessive fuel supply and has the disadvantage of overheating at sudden major load increases and disturbance of the ratio fuel to air.

According to the invention the signal for controlling the firing energy is directly transmitted to that one of the combustion components, fuel or air, whose effect on the combustion follows the control signal more slowly than the effect of the other component. The transmission of the signal for controlling the firing energy to that one of the combustion components whose effect on the combustion is relatively fast is delayed so that there is the desired ratio between the fuel and air supply at all operating conditions.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Figure 2:
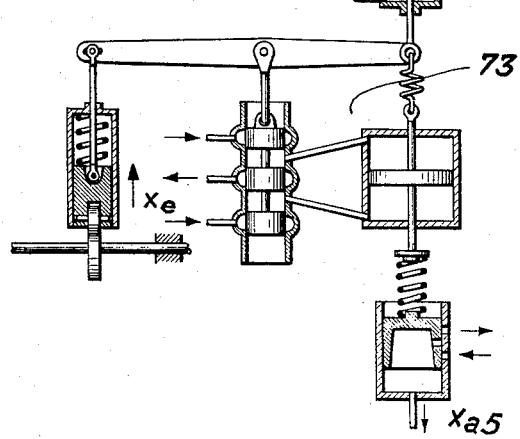
FIG. 2 is a diagrammatic showing of examples of control components that could be used in the plants of FIGURE 1 and FIGURE 3.

FIG. 2' is a diagrammatic illustration of a modification of a set point adjusting signal transformer suitable for use in the system according to the invention.

Figure 2A:
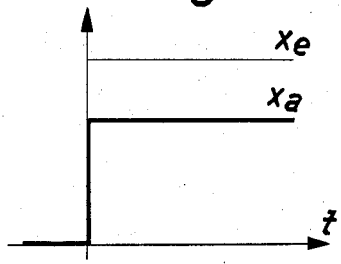
Figure 2B:
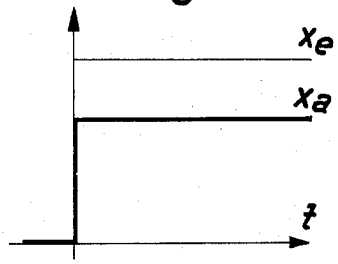
Figure 2C:
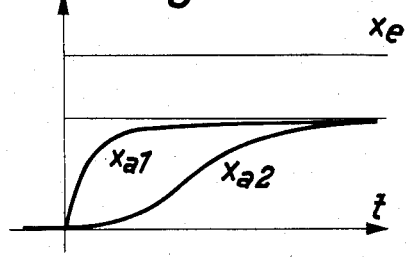
Figure 2D:
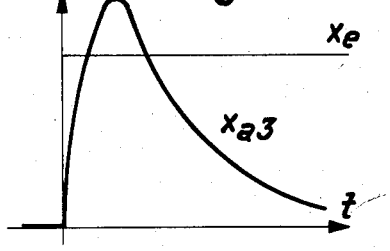
Figure 2E:
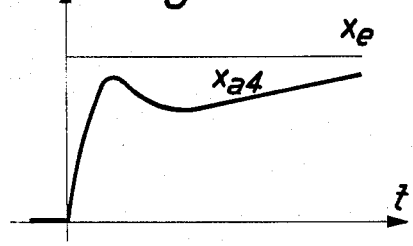
Figure 2F:
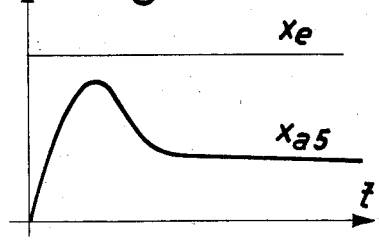

FIGS. 2a to 2f are diagrams individually illustrating the respective set point transformation effected by the individual set point signal transformers shown from left to right in FIG. 2 and in FIG. 2', FIG. 2a pertaining to the transformer shown at the left end of FIG. 2, FIG. 2b to the second apparatus from the left end in FIG. 2 and so on, FIG. 2e pertaining to the apparatus at the right end of FIG. 2 and FIG. 2f showing the set point transformation produced by the apparatus shown in FIG. 2'.

Figure 3:
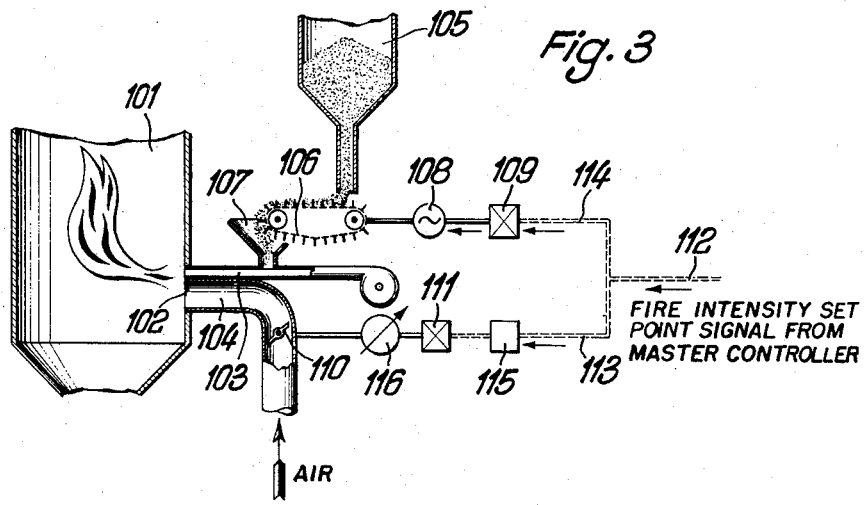

FIG. 3 is a part sectional diagrammatic illustration of a combustion plant controlled according to the invention.

Figure 4:
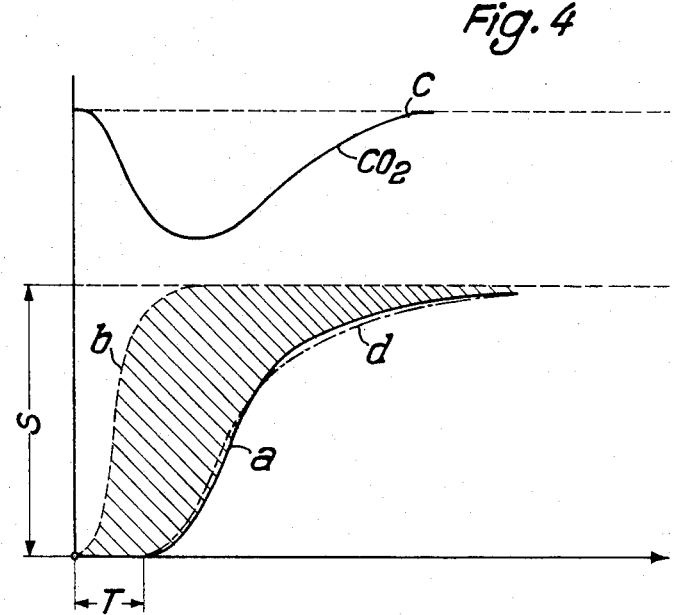

FIG. 4 is a diagram showing the effect of the control according to the invention on the combustion plant shown in FIG. 3.

Figure 1:
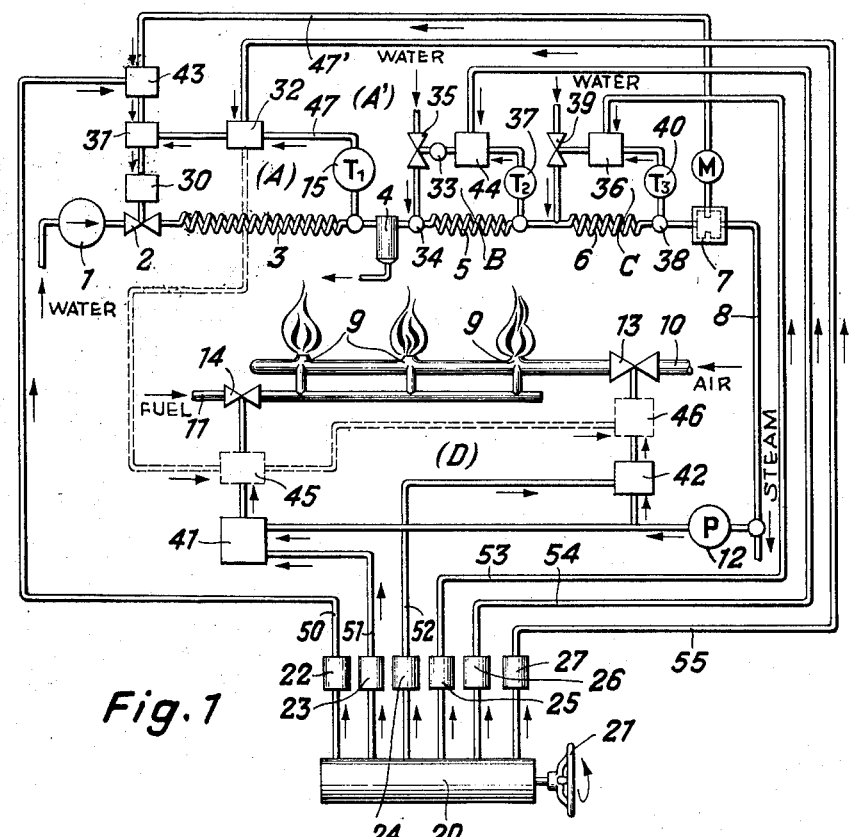
FIG. 1 is a diagrammatic showing of a forced flow steam generating plant which is controlled according to the invention.

Referring more particularly to the drawing, FIG. 1 diagrammatically shows a portion of a forced flow steam generating plant including a feed pump 1, a feedwater control valve 2 downstream of the pump 1, an economizer and evaporator heating surface 3 receiving feedwater from the pump 1, a water separator 4 for separating the water from the steam produced in the evaporator 3, a first superheater surface 5 receiving steam separated in the separator 4 and a second superheater 6 receiving steam from the first superheater 5. The live steam emerging from the superheater 6 is measured by a flowmeter 7 interposed in a live steam pipe 8 in which the steam pressure is measured by a device 12 downstream of the flowmeter 7. The heating surface portions 3, 5 and 6 are heated by burners 9 which receive fuel as a first combustion component from a fuel supply pipe 11 and combustion air as a second combustion component through a supply duct 10. The latter is provided with a regulating valve 13, the fuel supply pipe 11 being provided with a regulating valve 14.

The amount of feedwater passed by the valve 2 is controlled by a control apparatus 30 which is primarily responsive to the steam temperature $T_1$ measured by a device 15 at the outlet of the evaporator 3. The apparatus 30 is also responsive to disturbances indicated by the steam flowmeter 7. The devices 15 and 7 individually produce control signals which are fed into a summing device 31 wherein they are combined to form a corrected signal which actuates the apparatus 30. A control apparatus 33 is responsive to the steam temperature $T_2$ measured by a device 37 between the first superheater 5 and the second superheater 6 and controls the position of a valve 35 which regulates the amount of water injected into the inlet 34 of the first superheater 5. A similar temperature responsive control apparatus 36 controls the steam temperature $T_3$ measured by means of a thermostat 40 at the outlet 38 of the superheater 6, by controlling a valve 39 which regulates the amount of cooling water injected into the superheated steam between the superheaters 5 and 6. The fuel supply to the burners 9 is controlled by an apparatus 41 which actuates the fuel supply control valve 14. The air supply is controlled by an apparatus 42 which adjusts the combustion air valve or damper 13. The control apparatuses 41 and 42 are primarily responsive to the pressure P of the live steam measured by the device 12 which is operatively connected to the live steam pipe 8. Supplementarily, the valves 13 and 14 are controlled according to the steam temperature $T_1$ by means which will be described later.

A master controller or set point adjusting means 20 is provided which may be actuated by hand by operation of a hand wheel 21 according to the load or output demanded of the steam generator. The means 20 produces set point signals for adjusting the set points of the individual control apparatuses according to the load. The set point signals produced in the device 20 and serving different control apparatus are not all alike. They must be changed differently when the load is changed by manipulation of the wheel 21. For example, if the load on the steam generator is increased from a load at which the steam generator operates at low efficiency to a load at which it operates at high efficiency the feedwater supply must be increased proportionally to the load increase whereas the fuel supply must be increased at a lesser rate. Since combustion efficiency usually increases at such increased output the air supply must be still less increased. If the output of the steam generator is still more increased, the efficiency of the steam generation usually decreases so that the fuel supply must be increased to a greater extent than the increase of the feedwater supply. The temperatures $T_1$ and $T_2$ are not the same at all loads and the set points for the control of these temperatures must be changed differently when the steam output of the generator is changed. The set point signals are transmitted through conductors 50 to 55. A signal transformer or modifier is interposed in each of these conductors for individually changing the time characteristic of the signals, the transformers being designated by numerals 22 to 27. Suitable set point signal modifiers are illustrated in FIGS. 2 and 2' and their functions are shown in FIGS. 2a to 2f. The transformed set point signals are conducted to comparing devices for the individual control apparatuses which comparing devices compare the set point signal produced by the master controller 20 and transformed in the devices 22 to 27 with the signal corresponding to the value of the controlled variable at the time the new set point signal arrives, the controlled variables being the temperatures $T_1$, $T_2$, $T_3$, the rate of flow M of live steam and the steam pressure P. If the comparing device finds a difference between the two signals a control signal is transmitted to the respective control apparatus which adjusts the respective final control element according to said control signal so that this difference disappears. For example, the control apparatus 30 is operatively connected to two comparing devices 43 and 32. The control apparatus 33 is associated with a comparing device 44. The control apparatus and its comparing device or devices may form a structural unit. This is indicated in the illustrated example for the control apparatuses 36, 41 and 42. The apparatus 41 may be provided with a separate device 45 for supplying a signal resulting from the comparison of the temperature $T_1$ with the transformed set point signal in the conductor 55. The control apparatus 42 is provided with a device 46 for the same purpose.

In the illustrated plant the heating surface 3 constitutes a first stage and is also the zone controlled by the control circuit A which includes the control apparatus 30, the control valve 2, the controlled zone 3, the measuring device 15, a signal conductor 47 and the comparing device 32. The control circuit A is meshed with an auxiliary circuit A' whose controlled zone is formed by the heating surface portions 3, 5, 6 and which auxiliary circuit includes a flowmeter 7 producing signals transmitted through a conductor 47' to the comparing device 43 and therefrom through the summing device 31 to the control apparatus 30. The heating surface 5 is a further stage of the steam generating plant and forms the controlled zone of the control circuit B which includes the control apparatus 33, the valve 35, the temperature measuring device 37 and the comparing device 44. The heating surface 6 is also a stage of the steam generating plant and forms the controlled zone of a control circuit C including the control apparatus 36, the valve 39 and the temperature measuring device 40.

The combustion apparatus as a whole forms a controlled portion or stage of the steam generating plant which portion has a meshed control circuit D including the control apparatuses 41 and 42, a signal producing device 12 measuring the controlled variable P, the temperature measuring device 15 producing a signal corresponding to the auxiliary control value $T_1$ and the combustion apparatus.

The control circuits A, B, C, D are intimately coupled and equilibrium in the operation of the entire plant is only possible if each of the controlled variables, for example the temperatures $T_1$, $T_2$, $T_3$, the amount of live steam M, the steam pressure P, is in a steady condition and in proper relation to the respective set points which are also in a steady condition.

The individual control circuits A through D are interconnected by the effect of the amount of working medium, which is controlled by the valve 2 on the temperatures $T_1$, $T_2$ and $T_3$ which are also affected by the heat intensity produced by the combustion apparatus. The increase of feedwater admitted through valve 2 tends to consecutively reduce the temperatures $T_1$, $T_2$ and $T_3$, to increase the amount M of steam produced and to decrease the steam pressure P.

In case of a disturbance the dynamic behavior, for example, of the control circuits B and C is fundamentally different from the dynamic behavior of the control circuit D. For example, a temperature change in the circuits B and C acts on the respective control apparatuses 33 and 36 almost immediately so that these control apparatuses correct the controlled variable without appreciable time lag. The same temperature change acts much slower on the pressure of the steam at the location 12. Because of the natural heat accumulating capacity of the entire plant correction of the control of the fire intensity caused by the same temperature disturbance acts still much slower on the control circuit D.

It is the object of the invention to transform the set point signals, which are produced almost instantly by the master controller 20 upon turning of the hand wheel 21, according to the dynamic behavior of the individual control circuits A, B, C, D. In a forced flow steam generator each set point signal is transformed or modified according to the effect of a change of output of the respective controlled supply means for the feedwater, the steam cooling water, the fuel, and the combustion air on the operation of the steam generator. For example, at an increase of the load the natural inertia of the system can be counteracted, as far as the combustion apparatus is concerned, by temporarily increasing the supply of the combustion components beyond the actually needed supply by advancing the fire control signals. This operation, however, must last only until the increase of the operating temperature of the system after an initial inertia period, in which the temperature is not changed, justifies a reduction of the fire to the new load. Conversely, at a reduction of the load the burners 9 are initially excessively throttled so that thermal reaction of the system is accelerated.

At an increase of the load, the temperature set point signals, particularly for the temperature $T_1$ of the control circuit A, are transmitted at a relatively great time lag, because, otherwise, the device $T_1$ would initially report a temperature which is "too cold" so that the feedwater supply would be throttled untimely and would be the opposite of what is desired to cope with the increased load.

Several conventional methods are available for transforming a set point signal: The signal can be delayed during its transmission or the energy of the signal can be increased beyond the energy required for the new condition and after elapse of a certain time be reduced to the desired new value. In a modification of the latter method the signal can be vanished after transmission.

FIGS. 2 and 2' illustrate a variety of conventional apparatuses suitable for transforming or modifying a signal and for use as the transformers 22 to 27 diagrammatically shown in FIG. 1. In FIG. 2 numeral 21 designates the hand wheel shown in FIG. 1 for actuating a master controller according to the load. Upon rotation of the hand wheel 21 a shaft 60 connected thereto is rotated. The shaft is provided with cams 61 which lift or lower actuating members 62 forming part of individual set point signal producers for producing new set points $x_e$ desired for a new load upon rotation of the hand wheel 21. The new set point signals are individually transformed in the devices 22 to 27 of FIG. 1 in the manner hereafter described. FIGS. 2a to 2f illustrate different set point transmission functions $$x_a = \left(\frac{\delta x_e}{\delta t}\right)$$

The time characteristic of each set point signal $x_e$ is transformed by a transforming device and output signals $x_a$ are produced each of which is transmitted to a control apparatus. FIGS. 2a and 2b illustrate the effect of proportional transformations whereby a momentary change of $x_e$ immediately results in a change of $x_a$. In the illustrated example a mechanical element which is in the form of a lever 63 acts as transformer for producing the effect shown in FIG. 2a. The diagrammatically illustrated electric transformation device 66 effects a proportionality change, for example, by changing a variable resistance 67 according to the load. The effect of this transmission is shown in FIG. 2b. The diagrammatically illustrated hydraulic transmission 68 includes two delaying devices of the first order which are arranged in series relation and which, together, form a delaying device of the second order. FIG. 2c shows $x_{a1}$ as the initial value produced by the first delaying element 69. $x_{a2}$ is the set point signal $x_e$ transformed jointly by the delaying elements 69 and 70. The diagrammatically illustrated transformer 71 produces a so-called vanishing signal $x_{a3}$ of pure differential character which is represented by the curve $x_{e3}$ shown in FIG. 2d. A transformer 72 having proportional-differential-integral-character transforms a set point signal $x_e$ to a signal $x_{a4}$ shown in FIG. 2e. Because of the integral behavior which causes a steady rise of the curve $x_{a4}$ after an initial maximum and a subsequent minimum the respective transformer must have an end abutment or must be provided with a feedback so that the set point value does not rise indefinitely. The curve shown in FIG. 2f shows a transformation with proportional-differential-character of the initial set point signal $x_e$ to a signal $x_{a5}$ by means of a transformer 73 shown in FIG. 2'. This transformer advances the value $x_{a5}$ beyond the value corresponding to the new load and subsequently continuously reduces this value to the value corresponding to the new load.

Whereas the transformation functions illustrated in FIGS. 2a to 2f are characteristic of the aforesaid transforming possibilities, the illustrated transformers, per se, are conventional and are only examples of a large group of fundamental devices known in the automatic control art. These conventional devices which may act hydraulically, electrically, or pneumatically are not illustrated and described in detail because they are well known in the present-day automatic control art and their individual structural elements can be used in an almost indefinite number of combinations.

The described plant is only a typical example of a number of possible ways of practicing the process according to the invention. Coupling and meshing of the control circuits may be changed in many ways. The delaying elements may be interposed at any position in the conductors connecting the master controller to the individual control apparatuses; they may also form part of the individual control apparatuses.

The transformers 22 to 27 in FIG. 1 may all be of the type of the one composed of the elements 61, 62, 68–70 and shown in the middle of FIG. 2. In this case the conductors 50 to 55 would be formed by the piston rods carrying the transformed set point signals $x_{a2}$. The velocity at which the set point signals corresponding to the setting of the devices 61, 62 are transmitted to the conductors 50 to 55 can be adjusted by adjusting throttle valves 69' and 70' in conduits connecting cylinders 69" and 70" of the delaying elements 69 and 70, respectively, to pilot valves controlling the supply to and relief of pressure fluid from the cylinders 69" and 70". If the throttle valves 70' are fully open, the delaying device 70 has almost no effect and produces a set point signal transformation as represented by line $x_{a1}$ in FIG. 2c. If the throttle valves are partly closed, a time characteristic is obtained as represented by the curve $x_{a2}$ in FIG. 2c.

It may be posssible to omit delay of the transmission of the set point signal in one or several of the devices 22 to 27. In this case simplified set point signal transformers may be used as shown at the left side of FIG. 2 and designated by numeral 80, or of the type comprising the elements 66, 67. These transformers do not delay the set point signals and the signals $x_a$ are proportional to the stroke $x_e$ of the actuating members 62.

Signal transformers producing time characteristics as shown in FIGS. 2d, 2e and 2f are used where no delay or immediate transfer of the set point signal is desired, but where an accelerated reaction of the control apparatus to the new set point signal is required.

FIG. 3 illustrates the fundamental idea according to the invention as applied to a combustion apparatus. The latter includes a combustion chamber 101, a burner 102 to which pulverized coal is supplied through a pipe 103 and combustion air is supplied through a duct 104. The pulverized coal is transported from a bunker 105 by means of a conveyor belt 106 to a funnel 107 which discharges into the pipe 103. The conveyor belt 106 is driven by a motor 108 whose speed can be controlled by a control apparatus 109.

A damper 110 is arranged in the air duct 104. The position of the damper can be changed by means of a motor 116 which is controlled by a control apparatus 111. Air may be forced into the duct 104 by a fan driven by a variable speed motor, not shown, so that the amount of air entering the burner 102 is changed immediately after change of the position of the damper 110.

The fuel control apparatus 109 and the combustion air control apparatus 111 are connected by conductors 112, 113 and 114 to a master controller which is manipulated according to the load on the combustion chamber or on a steam generator which receives heat from the combustion chamber. Whereas in the set point signal conductor 114 the signal is directly transmitted from the conductor 112 to the fuel control apparatus 109 a delaying device 115 is interposed in the set point signal conductor 113 which is connected to the combustion air control apparatus 111. The delaying device transforms or modifies the time characteristic of a set point signal arriving through the conductor 112 so that the change of position of the damper 110 occurs at the same speed as the change of the speed of the conveyor 106 whenever the firing energy is changed. For this purpose a proportionally acting delaying element of the first and second order may be used.

FIG. 4 is a diagram illustrating the effect of the method practiced by the apparatus shown in FIG. 3.

The solid curve $a$ shows the increase of the fuel supply subsequently to a sudden increase of the fuel supply set point. There is a dead period T at the beginning of the control operation which is followed by a curve which gradually runs tangential into a dotted horizontal line indicating the new set point S. The curve $a$ is characteristic of conveyor controls in which the speed of the conveyor band is gradually changed. If the set point signal for the firing energy which acts without time lag on the inherently slowly reacting fuel control would act as quickly on the combustion air control, the damper 110 would effect supply of combustion air corresponding to the new set point within a much shorter time than the control of the fuel. The effect of this undesired quick change of the air supply by means of an undelayed set point signal is indicated by the dotted line $b$ in FIG. 4. Firing conditions in which the ratio between fuel and air is incorrect occur within the hatched area between the curves $a$ and $b$. A temporary operation in the zone of incorrect air/fuel ratio causes a reduction of the $CO_2$ content of the flue gases which is shown by the curve $c$. This reduction is accompanied by a considerable reduction of temperature and smoke.

The dash-dot curve $d$ shows how this discrepancy between the air and fuel supply can be eliminated by delaying the transmission of the set point signal for the combustion air control.

The above described example of a combustion control shows only one possible embodiment of the invention. The invention can also be applied to combustion control systems in which the delaying device must be interposed in the set point signal conductor for the fuel control apparatus, for example, if oil or gas is used as fuel whose effect on the combustion can be changed more quickly than the effect of a change of the air supply, particularly if the air supply is controlled by changing the speed of a fan.

I claim:

1. In a method for controlling the operation of a forced flow steam generator under variable load conditions, the steam generator including an evaporator, a superheater receiving steam from said evaporator, variable feedwater supply means for supplying feedwater to said evaporator at variable flow rates, variable fuel supply means and combustion air supply means for producing variable heat by the combustion of fuel in air for heating said evaporator and said superheater, and separate control means for each of said supply means for varying the output thereof, the effects of a change of supply of the feedwater, fuel and air on the operation of the steam generator being different, the method including the steps of simultaneously producing separate set point signals for each control means, said signals corresponding to the desired set points of the respective control means at static conditions of the steam generator operation, of separately and in parallel relation transmitting the set point signals to the respective control means, and of separately transforming each set point signal while the signal is transmitted according to the effect of a change of output of each supply means on the operation of the steam generator.

2. In the method defined in claim 1 and wherein transforming of at least one of the set point signals includes proportionally decreasing said set point signal.

3. In the method defined in claim 1 and wherein transforming of at least one of the set point signals includes slowing the transmission of said set point signal to the respective control means.

4. In the method defined in claim 1 and wherein transforming of at least one of the set point signals includes increasing and thereupon decreasing said set point signal.

5. System for adjusting the supply of fuel and combustion air to a combustion apparatus to suit variable loads, comprising adjustable fuel supply means, adjustable air supply means, adjustment of one of said supply means being relatively slow and affecting combustion relatively slowly, adjustment of the other of said supply means being relatively quick and affecting combustion relatively quickly, a control means connected to each of said supply means for adjusting the latter, a set point signal producing means, set point signal conduit means connected to said set point signal producing means and including a conduit connected to one of said control means and a conduit connected to the second of said control means, a set point signal delaying means interposed in the conduit connected to the control means for the supply means whose adjustment is relatively quick, the conduit connected to the control means for the supply means whose adjustment is relatively slow forming a direct connection to said set point signal producing means, whereby the set point signals are conducted immediately to the control means for the supply means whose adjustment is relatively slow and the set point signals are delayed in the conduit connected to the control means for the supply means whose adjustment is relatively quick and a ratio between the fuel and air supply is maintained affording efficient combustion at quick load changes.

6. A system for controlling the operation of a forced flow steam generator under variable load conditions, the steam generator including an evaporator, a superheater receiving steam from said evaporator, variable feedwater supply means for supplying feedwater to said evaporator at variable flow rates, variable fuel supply and combustion air supply means for producing variable heat by the combustion of fuel in air for heating said avaporator and said superheater, and variable water supply means for injecting cooling water into said superheater, the effects of a change of supply of the feedwater, fuel, air, and cooling water on the operation of the steam generator being different, the system including a separate control means for each of said supply means for varying the output thereof, signal producing means including means for simultaneously producing a separate set point signal for each of said control means, said set point signals corresponding to the desired adjustment of said supply means at static conditions of the steam generator operation, means for separately transmitting the set point signals in parallel relation from said signal producing means to the respective control means, and set point signal transforming means interposed in at least one of said transmitting means for transforming the respective set point signal while the signal is transmitted according to the effect of a change of output of the respective supply means on the steam generator operation.

(References on following page)

References Cited in the file of this patent

UNITED STATES PATENTS

| | | |
|---|---|---|
| 1,837,923 | Quinn | Dec. 22, 1931 |
| 2,217,634 | Rude | Oct. 8, 1940 |
| 2,258,719 | Saathoff | Oct. 14, 1941 |
| 2,623,698 | Dickey | Dec. 30, 1952 |
| 2,732,830 | Lavigne | Jan. 31, 1956 |
| 2,804,267 | Hohn et al. | Aug. 27, 1957 |
| 2,831,637 | Mittendorf et al. | Apr. 22, 1958 |
| 2,889,114 | Shannon | June 2, 1959 |

FOREIGN PATENTS

| | | |
|---|---|---|
| 358,618 | Great Britain | Oct. 15, 1931 |
| 1,032,749 | Germany | June 26, 1958 |

(Corresponding British 809,287, Feb. 18, 1959)

OTHER REFERENCES

German application S39,962, Oct. 20, 1955. (Corresponding British 771,715, Apr. 3, 1957.)